United States Patent [19]

Hooton

[11] 3,844,800

[45] Oct. 29, 1974

[54] FRICTION MATERIAL
[75] Inventor: Norris A. Hooton, South Bend, Ind.
[73] Assignee: The Bendix Corporation, South Bend, Ind.
[22] Filed: Feb. 20, 1973
[21] Appl. No.: 333,585

Related U.S. Application Data
[63] Continuation-in-part of Ser. No. 146,411, May 24, 1971, abandoned, which is a continuation-in-part of Ser. No. 799,345, Feb. 14, 1969, abandoned.

[52] U.S. Cl................... 106/36, 29/182.5, 106/286
[51] Int. Cl............................................. C09k 3/14
[58] Field of Search ............ 106/36, 286; 29/182.5; 264/111

[56] References Cited
FOREIGN PATENTS OR APPLICATIONS
604,776  9/1960  Canada................................. 106/36

*Primary Examiner*—Allan Lieberman
*Attorney, Agent, or Firm*—Leo H. McCormick, Jr.; William N. Antonis

[57] ABSTRACT

A metallic base friction material for use as a brake lining having a silicate glass additive to control wear by forming a surface glaze on the friction material while maintaining a substantially uniform coefficient of friction at temperatures above 1,000°C.

12 Claims, 5 Drawing Figures

NORRIS A. HOOTON
INVENTOR.

BY Robert A. Benziger

FRICTION MATERIAL

CROSS-REFERENCES TO RELATED APPLICATIONS

This application is a continuation-in-part of U.S. application Ser. No. 146,411 filed May 24, 1971 and now abandoned, which was a continuation-in-part of U.S. application Ser. No. 799,345 filed Feb. 14, 1969, now abandoned.

SUMMARY OF THE INVENTION

The present invention is related to friction materials and particularly to friction materials used in braking loads having ranges of kinetic energy from zero to those generated by today's aircraft during maximum energy braking at rejected take-off (RTO) where speed and load are greatest and available stopping distance is minimal. The general class of friction materials presently in use for such high energy applications is those friction materials which comprise a metallic base or matrix. That is, the friction material constituents are bonded together by a metal matrix. In addition to the metal matrix, such materials may also include friction producers such as ceramics, anti-oxidants such as graphite, friction modifiers such as boron nitride or molybdenum disulfide, and various reinforcement additives such as steel fibers.

The friction material presently in use in aircraft brakes possesses three characteristics which are interrelated to the point that the end product will often possess an unhappy comprise of these characteristics. The first of these is the size (weight) which the friction article components of aircraft brakes must have in order to achieve the required useful life in order to be accepted by the aircraft manufacturers; the second is efficiency (friction level) achieved by the system and the third is cost. In order to achieve maximum useful life for a given weight requirement, certain additions are made to the base or matrix metal, usually copper and commonly iron, in order to achieve a specific friction level or braking efficiency, with other additions being made to improve wear characteristics. These additions, which fall within one or more of the broad classes referred to above, provide various chemical effects and controls as described hereinbelow. These additions are usually offsetting so that often a third, a fourth, a fifth addition, and sometimes more, must be made before an acceptable friction material is achieved. The seemingly never-ending adding process causes the cost of the friction material to increase as the additions become more exotic and the development time increases. Furthermore, as the percentage of additions increases, the percentage of base material decreases so that the matrix strength of the friction article is reduced. It is often the case that the matrix strength is reduced to the point that further additions are not possible, even though the wear characteristic or the efficiency of the friction article is not completely satisfactory.

The reduced matrix strength also results in difficult and expensive fabrication costs in converting the final friction material to the desired friction article. It is, therefore, an objective of the present invention to provide a friction material which has improved wear characteristics when compared to state-of-the-art friction materials while maintaining high efficiency levels. It is also an object of the present invention to provide such a friction material which has a higher matrix strength than friction materials possessing similar friction and wear levels.

It is known that the surface film, or glaze, which appears on the contact surface of a friction material, in use, is of great importance in the operation of the friction system. If allowed to become too thick, the shear properties of the film override the shear properties of the base matrix which then lowers the obtainable friction level and causes undesirable friction-velocity effects. If the film becomes too thin, metallic contact occurs across the sliding interface resulting in excessive wear.

Control of this film is principally a chemical phenomenon. In metal-based linings, the film is mainly an oxide, though it is neither entirely homogeneous nor entirely crystalline in composition. The cations present in the film are those known to have a fairly strong affinity for oxygen. Control of the cation composition of the film has been generally accomplished by the use of metallic additions to the lining material while control of the oxygen content of the film is generally accomplished by the anti-oxidant, normally graphite, in the composition, which preferentially reacts with some of the oxygen and removes it as a gaseous product. Recognizing that the film or glaze is a critical region of the friction article, it is an object of the present invention to provide a means for controlling film formation and thickness while, at the same time, avoiding the number and/or volume of friction material additions formerly required. It is also an object of this invention to reduce the number and/or volume of additions to friction material without adversely affecting the wear rates and friction levels obtained with the present state-of-the-art friction materials. It is also an object of the present invention to provide a friction material in which the surface film or glaze is controlled in thickness by the use of a new addition to the friction material which permits the reduction of the graphite content and the elimination of many of the cation control metals.

Prior art friction articles have required graphite additions of as much as 20% to 30% by volume. I have found that in the friction material described hereinbelow, graphite additions can be reduced by half or more. Since the addition of graphite is necessary to control oxygen content of the film and yet is known to produce structural weakness of the friction material, it is an object of this invention to provide a friction material in which the need for graphite as an additive to the base or matrix-metal of the friction material is reduced to permit an improvement in the structural strength of the friction material without adversely affecting the properties of the glaze.

Friction systems used as brakes are required to reduce the kinetic energy of a moving mass by converting this energy to other forms. This is done principally by generating heat at the rotor-stator interface. In order to have maximum efficiency, the heat generated must by rapidly dissipated and this requires that the friction article have a high thermal conductivity. It is known that as the metal cation control additions increase, the thermal conductivity of the base matrix decreases. It is, therefore, an object of this invention to provide a friction material having improved thermal conductivity by reducing the number of metal cation control additions without adversely affecting the wear and friction characteristics of the state-of-the-art friction materials.

Examination of a photomicrograph of the contact surface of a friction article (as shown in FIGS. 1, 2, 3 and 4) shows that plastic deformation occurs at the friction interface. However, excessive wear results whenever a fracture occurs as when the glaze becomes too thick. It is, therefore, a specific object of this invention to provide an additive for friction materials which promotes the plastic deformation at the glaze surface. Since glass has a unique and defining characteristic which would be beneficial to the promotion of plastic deformation, it is a still further object of this invention to provide a friction material containing a material beneficial to the promotion of plastic deformation, in the form of glass.

Glass possesses a thermodynamic uniqueness which sets it apart from both metallic and crystalline ceramic materials. Although its non-crystalline structure is theoretically unstable, it can exist for great lengths of time in a semi-fluid state. While in this "glassy" state, it responds to imposed forces by flowing in a bulk fluid fashion, rather than by slip (as with metals) or by brittle fracture (as with most crystalline ceramics). The parameter defining the relative ease with which the material will flow is its coefficient of viscosity. One distinct property of glass, which sets it apart from the materials currently being utilized as an addition to a friction material, is the ability to reversibly respond to temperature by altering its viscosity from that resembling a solid to that of a "watery-fluid," in a smooth manner, without the abrupt changes associated with the melting of solid crystalline substances. The prior art friction materials were subjected to "fade" and excess wear as the heat generated during braking caused various constituents of the friction material to become liquid. As liquids, these constituents were not readily retained in the friction material. Glass, on the other hand, softens or becomes less viscous as its temperature increases, but liquefication and subsequent loss by fluid run-out can be prevented. It is believed that, as the glass becomes less viscous, plastic deformation of the glaze is promoted and substantial amounts of energy derived from the braking action are expended by the glaze and boundary layer friction material as they plastically deform. Glass, as defined in George W. Morey in his text Properties of Glass — Second Edition, copyrighted by the Waverly Press and printed by the Reinhold Publishing Company, "is an inorganic substance in a condition which is continuous with, and analogous to, the liquid state of that substance, but which, as a result of a reversible change in viscosity during cooling, has attained so high a degree of viscosity as to be, for all practical purposes, rigid."

While in isolated instances, the prior art has suggested the use of specific glasses in friction materials, the types and amounts of glasses suggested and the purpose for the glass inclusion indicate that the energy consuming mechanism and the general benefits of the herein described invention were not present. U.S. Pat. No. 2,951,280 "Friction Elements" to Spokes, et al, suggests that a glass material, sodium silicate or "waterglass," can be used as the binder for alumina and silica flours. British Pat. No. 995,198 similarly suggests the use of a very high lead content glass as a binder agent. In both instances, the viscosity of the suggested glasses is sufficiently low that the glass is too liquid to function in the manner of the present invention. U.S. Pat. No. 2,784,105 suggests that siliceous glass may be a constituent of mullite formed by conversion of kyanite. Such glass is known to have a very high viscosity causing this type of glass to behave more as a friction producing material such as the known ceramic and mullite additions. In each of the above noted references, alternative, nonglass additions, were specifically stated as being fully equivalent to the specified glass additions which clearly indicates that these glass additions were not contemplated to perform the same function as performed by my inventive contribution to friction materials.

DETAILED DESCRIPTION OF THE DRAWING

Figure 1:
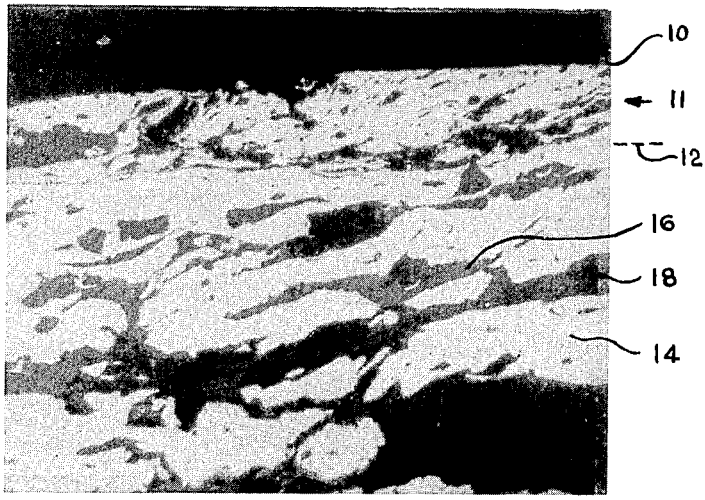
FIGS. 1, 2, 3 and 4 are 500 × photomicrographs of various metal-based friction materials after periods of use showing the glaze formation and plastic deformation patterns. They have been mounted to show relative motion of the rotor right to left at the interface.

FIG. 1 shows a 500 × photomicrograph of a copper-based friction material comprised of 60% copper matrix, 30% glass, and 10% graphite, the percentages being based on volume. The interface region between rotor and stator was at the boundary designated as 10. The heavily deformed region 11 lying below the boundary 10 and above the boundary 12 shows the effects of plastic deformation. In this figure, the copper matrix is designated by 14, the graphite by 16 and the glass by 18.

Figure 2:
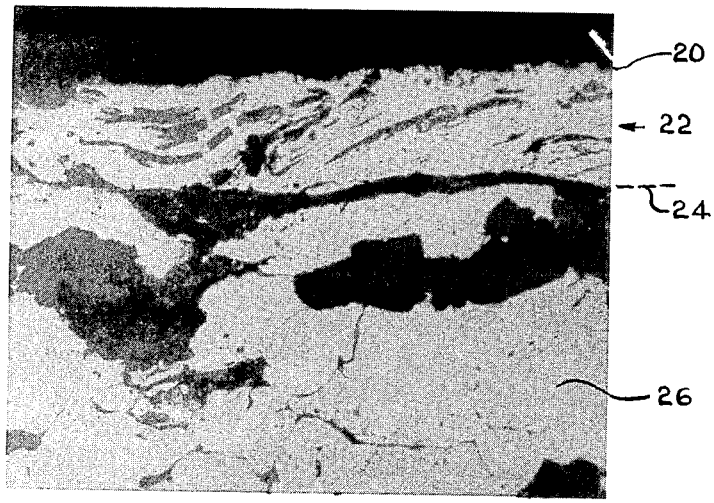

FIG. 2 shows, at the same magnification, a friction material comprised of 50% nickel, 30% mullite, 10% glass, and 10% graphite. Again, all percentages are based on volume and, unless otherwise indicated, percentages given hereinafter will be volume percentages. In this FIG. 2, the interface is designated by 20, the heavily deformed region is designated generally by 22 and lies between the boundaries 20 and 24 and the nickel matrix material is designated by 26. The heavily deformed region 22 again demonstrates the effects of plastic deformation.

Figure 3:
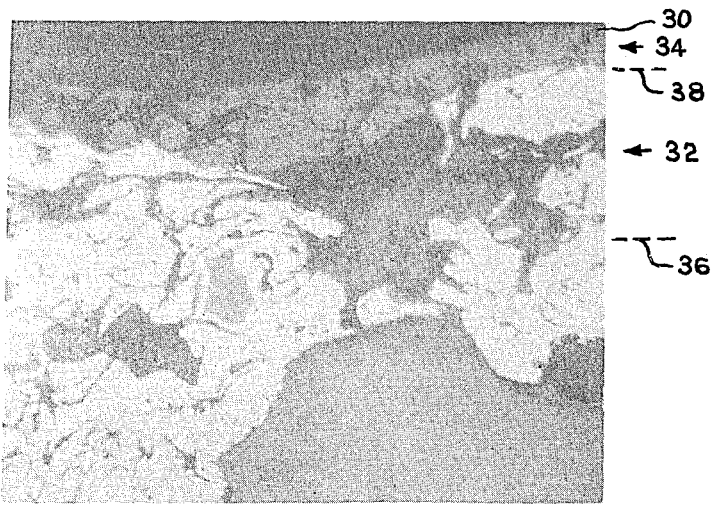

FIG. 3 shows, at the same magnification, a friction material comprised of 45% iron, 30% mullite, 15% graphite, and 10% glass. In this FIG. 3 the interface is designated by 30. The deformed region, designated generally by 32 lies between the boundaries 30 and 36 and includes the interface film or glaze, designated generally by 34, lying between the boundaries 30 and 38 and the boundary layer of the friction material. As can be seen, both the glaze 34 and the deformed region 32 demonstrate the effects of plastic deformation.

Figure 4:
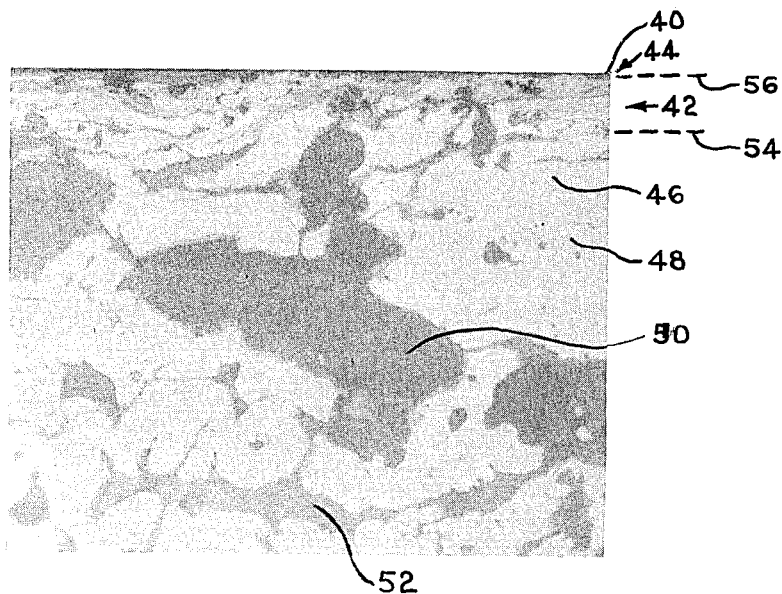

FIG. 4 illustrates still another friction material, this one comprised of 33.3% copper, 11.7% iron, 30% mullite, 15% graphite, and 10% glass. In this FIG. 4, the interface is designated by 40. The deformed region, designated generally by 42 lies between the boundaries 40 and 54 and includes the interface film, or glaze, designated generally by 44, lying between the boundaries 40 and 56 and the boundary layer of the friction material. The copper is designated by 46, the iron by 48, the mullite by 50, and the graphite by 52.

While the photomicrographs shown in FIGS. 3 and 4 clearly show that a surface film or glaze has been formed, it should not be inferred that it is absent in FIGS. 1 and 2. Rather, the film formed on the friction material of the FIGS. 1 and 2 photomicrographs is so thin as to not appear in these photomicrographs at this magnification. Also, it should be noted that interactions between the various constituents used in the friction materials whose photomicrographs are reproduced as FIGS. 1 through 4 have made it extremely difficult to identify the constituents in all instances.

COMPARATIVE TEST RESULTS

In order to test the hypothesis that glass, as an additive to a friction material, improved the overall performance of the friction material, a series of tests were performed on friction material in the form of brake linings containing glass of various constituents and in varying percentages. The linings were formed by conventional powder metallurgical techniques.

The commerical glasses which were investigated and are reported herein are listed in Table 1. Included in this table are the suppliers designation and glass type, as well as the specific gravity of each glass.

Glasses A thru C are available as enamel frits from the Chicago Vitreous Corporation, Cicero, Ill. Glasses D thru I are available as glass powder from the Corning Glass Works, Corning, N.Y. Glass E, because of its ready availability, has been used extensively herein to generate the desired test data. However, this glass is not to be considered the "best" glass because the end use of the friction article will determine which of the many types of glass is best.

All of the glasses discussed herein are silicate glasses, those containing silicon oxide as the principal glass forming component. While non-silicate glasses could also be potentially acceptable for the purpose of this invention, they represent only a small fraction of the available glass systems and were not extensively investigated.

The ranges of oxide constituents present in various classes of comerical glass materials is shown in Table 1A. For those composition classes with ranges, the composition of a typical member is shown in parentheses.

TABLE I

| Glass Designation | Source* & Designation | Compositional Type | Specific Gravity |
|---|---|---|---|
| A | C.V. 751 | Leaded Cobalt Glass | 2.77 |
| B | C.V. 6600 | Lead Aluminum Glass | 2.50 |
| C | C.V. 15-s-184 | Barium Crown Glass | 3.42 |
| D | C.G. 8378 | High Lead Glass | 4.22 |
| E | C.G. 0010 | Potash, Soda, Lead Glass | 2.86 |
| F | C.G. 0160 | Lead Glass | 3.05 |
| G | C.G. 7052 | Borosilicate Glass | 2.28 |
| H | C.G. 7740 | Borosilicate Glass | 2.28 |
| I | C.G. 7900 | 96% Silica Glass | 2.18 |

Figure 5:
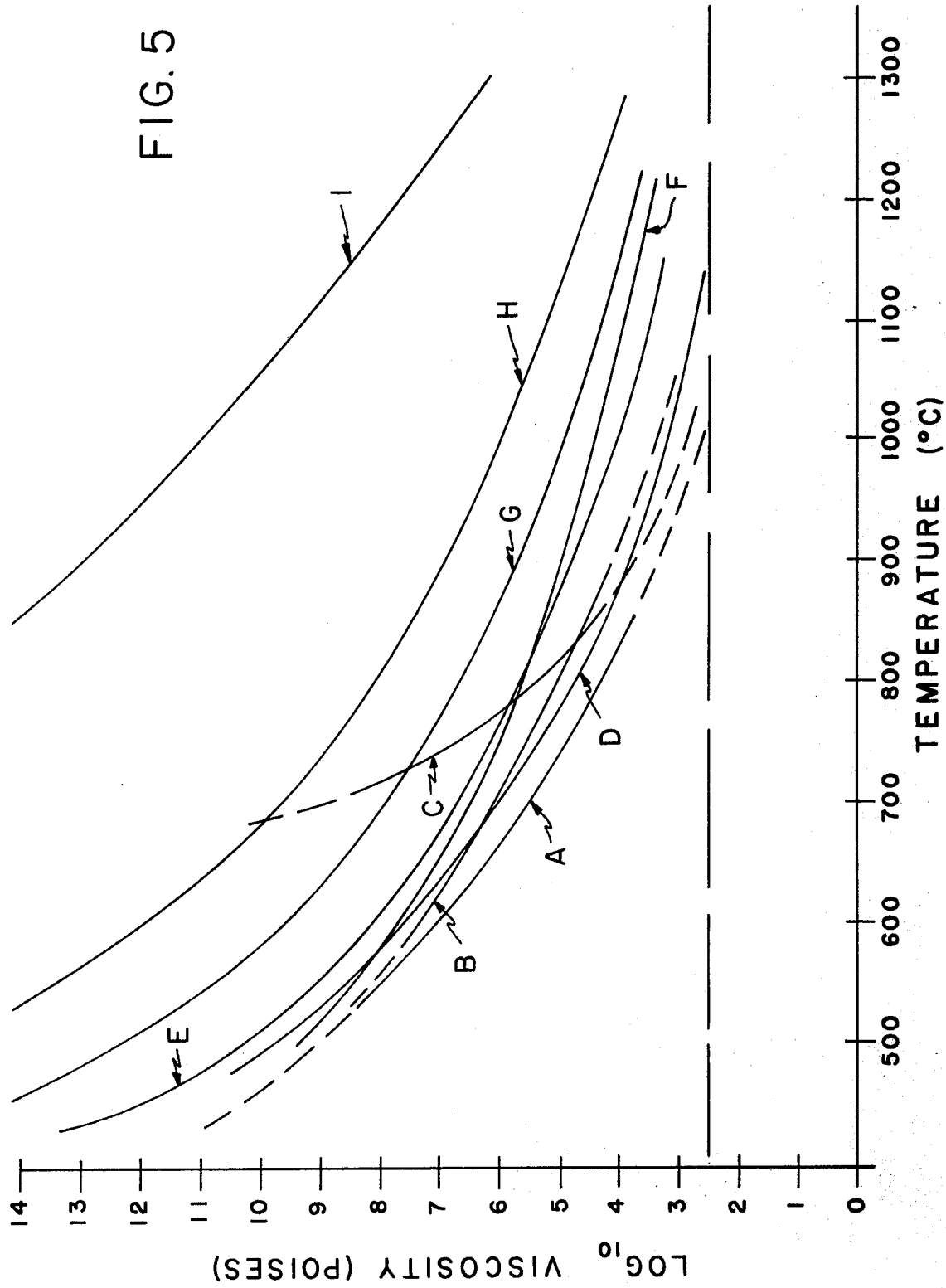
FIG. 5 is a graph comparing viscosity to temperature of various silicate glasses capable of producing the glaze shown in FIGS. 1, 2, 3 and 4.

* C.V. - Chicago Vitreous Corp., Cicero, Illinois
  C.G. - Corning Glass Works, Corning, New York The temperature-viscosity relationships of the above investigated glasses, obtained from suppliers data, is presented in FIG. 5. Line 100 represents a viscosity of about $10^{2.5}$ poises, the viscosity defining the melting temperature range of the specific glasses shown in Table 1.

Pressed and sintered linings containing silicate glasses were fabricated by conventional powder metallurgical techniques involving mixing, compacting, sintering and coining. The friction materials thus produced were then fabricated into steel cups which were attached directly to a test dynamometer. The technique of fabrication is well known to the man skilled in the art and need not be further discussed. All glasses were included in the powder mixture, prior to compacting as −100 mesh powder.

All testing was done on a research dynamometer which employes a single lining surface and a single rotor ring. The copper-, copper:iron- and iron-based pressed and sintered compositions were tested against an AMS 6385 steel rotor while the nickel-based compositions were tested against an AMS 6385 steel rotor which had been coated with a metal-ceramic composite plasma sprayed material.

The test conditions employed in this study are shown in Table 2. Note that the average rates of energy transfer (ft.-lb./sec.) are similar for all three procedures.

TABLE IA

COMPOSITIONS OF COMMERCIAL GLASSES

| Component | Soda-lime | Lead | Composition, % Borosilicate | 96% Silica | Silica Glass |
|---|---|---|---|---|---|
| SiO₂ | 70–75(72) | 53–68(68) | 73–82(80) | 96 | 99.8 |
| Na₂O | 12–18(15) | 3–10(4) | — | — | — |
|  | 5–10(10) |  |  |  |  |
| K₂O | 0–1 | 1–10(6) | 0.4–1 | — | — |
| CaO | 5–14(9) | 0–6(1) | 0–1 | — | — |
| PbO | — | 15–40(15) | 0–10 | — | — |
| B₂O₃ | — | — | 5–20(14) | 3 | — |
| Al₂O₃ | 0.5–2.5(1) | 0–2 | 2–3(2) | — | — |
| MgO | 0–4(3) | — | — | — | — |

TABLE 2

| PROCEDURE | TEST CONDITIONS No. of STOPS | LINING AREA LOADING (Ft.-lb./In.²) | STOP TIME (Sec.) |
|---|---|---|---|
| I | 50 | 21,000 | 20.0 |
| IIa | 25 | 11,800 | 19.6 |
| b | 20 | 17,500 | 24.3 |
| c | 20 | 23,600 | 22.0 |
|  | 65 |  |  |
| IIIa | 10 | 17,900 | 12.8 |
| b | 5 | 27,400 | 15.7 |
| c | 5 | 35,800 | 18.0 |
| d | 5 | 45,700 | 24.7 |
|  | 25 |  |  |

Procedures II and III are cumulative tests.

The lining area loading for these Procedures cover the range generally encountered in aircraft brake applications.

Reduction of wear rate is the most significant effect of glass additions and all tests are evaluated on the basis of wear rate. However, for the purpose of comparing the braking efficiency, or coefficient of friction, of the various friction materials (i.e., those containing glass in accordance with my invention and the state of the art friction material) data indicative of efficiency is also included. It will be readily observed from the data of Table 9 that an improvement in efficiency is also realized by friction materials containing glass in accordance with my invention.

Listed in Table 3 are the wear results of eleven (11) tests which compare the effect in pressed and sintered compositions of various glasses with a nonglass containing composition (Test 1) and a state-of-the art material (Test 11). It will be observed from Table 3 that, in all instances, wear rate was reduced markedly from that encountered in Test 1. The materials tested in Tests 2 through 10 demonstrate that glass is an effective additive in a system comprising metal, ceramic, graphite and glass. This suggests that, in systems presently utilizing a variety of additives as friction modifiers and glaze formers, glass may effectively replace one or several of these friction modifiers and glaze formers. For the sake of comparison with a state of the art lining, Test 11 was run on a lining having 31 volume percent of copper, 22 volume percent of mullite, 32 volume percent of graphite and 15 volume percent of metallic and nonmetallic friction modifiers and glaze formers. This lining was compacted at 60,000 PSI, and sintered in an exothermic atmosphere at 100,000 PSI and 1,800°F for 30 minutes. While the wear rates of Tests 2 through 10 do not show such a dramatic improvement over the results of the testing of the state of the art material, it should be pointed out that the state of the art material used is a highly developed product in which maximum optimization has occurred, while the materials in Tests 2 through 10 represent a non-optimized, somewhat random volume constituency. It should also be pointed out that, ignoring for the moment the test results, the materials used in Tests 2 through 10 have approximately 50% greater matrix material and ½ the graphite so that these materials would demonstrate greater strength and heat conductivity.

Table 4 lists several tests in which Glass E has shown significant wear rate reduction. Note that these include Cu-base, Ni-base, Fe-base and Cu:Fe-base compositions.

TABLE 3

| | Composition (Volume %) | | | | Sintered (F°) | Temperature or (C°) | Sintered Time (Min.) | Test Procedure II Wear Rate (in./stop) | | |
|---|---|---|---|---|---|---|---|---|---|---|
| Test No. | Cu | Mullite | Graphite | Other | | | | 11a | 11b | 11c |
| 1 | 55 | 30 | 15 | None | 1750 | 954 | 30 | .00033 | .00044 | .00092 |
| 2 | 45 | 30 | 15 | 10 Glass A | 1700 | 927 | 45 | .00013 | .00009 | .00015 |
| 3 | 45 | 30 | 15 | 10 Glass B | 1750 | 954 | 30 | .00023 | .00000 | 00004 |
| 4 | 45 | 30 | 15 | 10 Glass C | 1750 | 954 | 30 | .00011 | .00011 | .00018 |
| 5 | 45 | 30 | 15 | 10 Glass D | 1700 | 927 | 45 | .00011 | 00004 | .00001 |
| 6 | 45 | 30 | 15 | 10 Glass E | 1750 | 954 | 30 | .00011 | .00009 | .00013 |
| 7 | 45 | 30 | 15 | 10 Glass F | 1750 | 954 | 30 | .00009 | .00004 | .00006 |
| 8 | 45 | 30 | 15 | 10 Glass G | 1750 | 954 | 30 | .00055 | .00005 | .00004 |
| 9 | 45 | 30 | 15 | 10 Glaas H | 1750 | 954 | 30 | .00011 | .00003 | .00004 |
| 10 | 45 | 30 | 15 | 10 Glass I | 1750 | 954 | 30 | .00011 | .00012 | .00004 |
| 11 | 31 | 22 | 32 | 15 Metallic Modifiers and Glaze Formers | 1750 | 954 | 30 | .00009 | .00015 | .00019 |

All compositions were compacted at 60,000 PSI, sintered in a hydrogen atomsphere and coined at 100,000 PSI

TABLE 4

| Test No. | Composition (Volume %) | | | | | | Test Procedure I Wear Rate (in./stop) |
|---|---|---|---|---|---|---|---|
| | Cu | Ni | Fe | Mullite | Graphite | Glass E | |
| 1 | 55 | — | — | 30 | 15 | — | .00097 |
| 2 | 45 | — | — | 30 | 15 | 10 | .00007 |
| 3 | — | 55 | — | 30 | 15 | — | .00083 |
| 4 | — | 45 | — | 30 | 15 | 10 | .00028 |
| 5 | — | — | 55 | 30 | 15 | — | .00032 |
| 6 | — | — | 45 | 30 | 15 | 10 | .00028 |
| 7* | 40.8 | — | 14.2 | 30 | 15 | — | .00024 |
| 8* | 33.3 | — | 11.7 | 30 | 15 | 10 | .00007 |

*These compositions contained Cu and Fe in a ratio of 2.85/1. All compositions were compacted at 60,000 PSI, sintered in a hydrogen atmosphere for 30 minutes and coined at 100,000 PSI. Sintering temperatures were: Tests 1–2, 1750°F, Tests 3–4, 2050°F; Tests 5–8, 1750°F.

Table 5 summarizes the results of tests designed to demonstrate that the ability of glass additions to reduce wear is not dependent upon the presence of another specific nonmetal. Under the heading "ceramic" are listed various friction producing ceramic materials. The Table shows that Glass E reduces wear not only in systems containing mullite, aluminum oxide, crystalline silicon oxide, and the other commonly used ceramic friction producing materials, but even in systems containing no friction producing ceramic.

All compositions were compacted at 60,000 PSI, sintered at 1,750°F for 30 minutes in a hydrogen atmosphere, and coined at 100,000 PSI.

TABLE 5

| Test No. | Composition (Volume %) | | | Ceramic | Test Procedure I Wear Rate (in./stop) |
|---|---|---|---|---|---|
| | Cu | Graphite | Glass E | | |
| 1 | 80 | 20 | — | — | .04110 |
| 2 | 60 | 20 | 20 | — | .00700 |
| 3 | 55 | 15 | — | 30 Mullite | .00097 |
| 4 | 45 | 15 | 10 | 30 Mullite | .00007 |
| 5 | 55 | 15 | — | 30 Al$_2$O$_3$ | .02400 |
| 6 | 45 | 15 | 10 | 30 Al$_2$O$_3$ | .00335 |
| 7 | 55 | 15 | — | 30 Crystalline SiO$_2$ | .00011 |
| 8 | 45 | 15 | 10 | 30 Crystalline SiO$_2$ | .00005 |
| 9 | 55 | 15 | — | 30 Forsterite | .00007 |
| 10 | 45 | 15 | 10 | 30 Forsterite | .00003 |
| 11 | 55 | 15 | — | 30 Cordierite | .00076 |
| 12 | 45 | 15 | 10 | 30 Cordierite | .00009 |
| 13 | 55 | 15 | — | 30 Raw Kyanite | .00345 |
| 14 | 45 | 15 | 10 | 30 Raw Kyanite | .00029 |
| 15 | 55 | 15 | — | 30 Sillimanite | .00107 |
| 16 | 45 | 15 | 10 | 30 Sillimanite | .00004 |

All compositions were compacted at 60,000 PSI, sintered at 1,750°F for 30 minutes in a hydrogen atmosphere, and coined at 100,000 PSI.

Table 6 presents data supporting the lack of dependence upon graphite in the composition. The replacement of 10 volume percent of mullite by glass reduces wear not only when graphite is present, but also when it is absent. It should be noted that the decrease in wear between tests 1, 3 and 5 is a result of the reduction of graphite.

TABLE 6

| Test No. | Composition (Volume %) | | | | Procedure II Total Wear (in.) |
|---|---|---|---|---|---|
| | Cu | Mullite | Glass E | Graphite | |
| 1 | 50 | 30 | — | 20 | .0307 |
| 2 | 50 | 20 | 10 | 20 | .0184 |
| 3 | 60 | 30 | — | 10 | .0162 |
| 4 | 60 | 20 | 10 | 10 | .0128 |
| 5 | 70 | 30 | — | — | .0026 |
| 6 | 70 | 20 | 10 | — | .0005 |

All compositions were compacted at 60,000 PSI, sintered at 1,750°F for 30 minutes in a hydrogen atmosphere, and coined at 100,000 PSI.

Table 7 shows the effect on wear rate of substituting Glass E for copper. Two sets of wear results are given since the major advantage of a one percent addition of Glass E to this system appears to be improved glaze formation in the first five stops which subsequently reduces the wear rate.

TABLE 7

| Test No. | Composition (Volume %) | | | | Test Procedure I Wear Rate (in./stop) | |
|---|---|---|---|---|---|---|
| | Cu | Mullite | Graphite | Glass E | Complete Test | After 5 Stops |
| 1 | 55 | 30 | 15 | 0 | .00097 | .00090 |
| 2 | 54 | 30 | 15 | 1 | .00084 | .00090 |
| 3 | 53 | 30 | 15 | 2 | .00029 | .00023 |
| 4 | 52 | 30 | 15 | 3 | .00012 | .00009 |
| 5 | 50 | 30 | 15 | 5 | .00013 | .00012 |
| 6 | 45 | 30 | 15 | 10 | .00007 | .00004 |
| 7 | 35 | 30 | 15 | 20 | .00010 | .00009 |
| 8 | 25 | 30 | 15 | 30 | .00012 | .00010 |

All testing has indicated that the upper limit of glass content is controlled by the weakness of the resulting lining. However, in an effort to establish a definite test with high glass content, a series of tests were run with a lower mullite content which would allow larger glass additions to be made. The results of these wear tests are shown in Table 8. These data show that very low wear rates are still being maintained in compositions containing 50 volume percent glass. This seems to represent the upper limit, however, since wear is beginning to increase at this point as a result of the reduction in the amount of matrix material.

TABLE 8

| Test No. | Composition (Volume %) | | | | Test Procedure I Wear Rate (in./stop) |
|---|---|---|---|---|---|
| | Cu | Mullite | Graphite | Glass E | |
| 1 | 75 | 10 | 15 | 0 | .02450 |
| 2 | 70 | 10 | 15 | 5 | .01330 |
| 3 | 65 | 10 | 15 | 10 | .00090 |
| 4 | 55 | 10 | 15 | 20 | .00026 |
| 5 | 45 | 10 | 15 | 30 | .00012 |
| 6 | 35 | 10 | 15 | 40 | .00014 |
| 7 | 25 | 10 | 15 | 50 | .00015 |

All compositions were compacted at 60,000 PSI, sintered at 1,750°F. for 30 minutes in a hydrogen atmosphere, and coined at 100,000 PSI.

In order to compare wear rates and efficiency for a variety of test conditions, the data of Table 9 was accumulated. The conventional lining material is of identical composition with that used for comparison with the Table 3 data, while the glass-containing lining material is identical with that used in Test 6 of Table 3. It will be observed that in all but the lowest energy test conditions (those found in Procedures IIa and IIIa) the friction material, according to my invention, showed both improved wear and improved efficiency over the conventional lining material. The lowest energy test conditions show that, while wear is somewhat higher, efficiency is very much improved. It should be remembered, however, that the conventional lining material is a highly sophisticated product, whereas the glass-containing lining material does not represent an optimized end-product, but rather is convenient and random combination of the desired constituents designed to be illustrative rather than definitive.

trations illustrated in the above-demonstrative tests, achieves the stated objectives. A reduction in wear is clearly demonstrated, friction levels are improved, the volume percentage of matrix-metal is improved while the volume percentage of additions such as graphite and the other glaze forming and controlling materials is reduced. While the magnitude of the effect of glass as an additive depends upon the type and volume percent of the glass addition, the presence of these desirable and beneficial effects is shown by the above tests to be independent of the presence of other additives to the friction material. It should also be noted that the above-mentioned inclusion of a glass constituent in the friction material may be accomplished in situ during the processes of fabrication or use as a friction material by causing the required constituents of the glass to be placed in contact with each other in such a fashion that

TABLE 9

| | PROCEDURE II | | | | | |
|---|---|---|---|---|---|---|
| | IIa | | IIb | | IIc | |
| | Wear Rate* | Eff. | Wear Rate* | Eff. | Wear Rate* | Eff. |
| Conventional Lining | .00009 | .477 | .00015 | .489 | .00019 | .514 |
| Glass-containing Lining | .00011 | .776 | .00009 | .743 | .00013 | .578 |

| | PROCEDURE III | | | | | | | |
|---|---|---|---|---|---|---|---|---|
| | IIIa | | IIIb | | IIIc | | IIId | |
| | Wear Rate* | Eff. | Wear Rate* | Eff. | Wear Rate* | Eff. | Wear Rate* | Eff. |
| Conventional Lining | .00020 | .406 | .00052 | .443 | .00054 | .458 | .00086 | .469 |
| Glass-containing Lining | .00026 | .521 | .00030 | .539 | .00014 | .521 | .00014 | .481 |

*Wear Rate is in inches/stop.

It has been determined that glass additions to a metal-based friction material for use in aircraft brakes requires that the viscosity of the glass addition be above the ASTM melting range (approximately $10^{2.5}$ poises) in the maximum temperature region. This maximum temperature region in metal-based aircraft brakes is from about 1,000°C up to about 1,100°C., see FIG. 5, Glasses which exhibit viscosity values lower than $10^{2.5}$ poises in this specified temperature range have been found to be unsatisfactory for at least two reasons. First, their low melting temperature restricts the sintering temperature of the resulting metal matrix system to values too low to develop adequate strength and density. Should the sintering temperature be increased, run-out of the glass constituents occurs, resulting in an inferior product. Secondly, even in those systems where sufficient strength and glass content could be maintained to allow some testing to proceed, the increased fluidity of these glasses would prove detrimental to the friction coefficient.

While the hereinabove data was accumulated by using −100 mesh glass powders, this was primarily to eliminate glass particle size as an uncontrollable variable. Other testing, not tabulated herein, has shown that the glass may be added to the powder mixture as particles down to −325 mesh and up to −20 mesh with the resulting friction article being satisfactory. Little variation in the end article was noted over the broad range of glass particle additions. It is, therefore believed that particle size is only of importance in that the glass particles, as added, be small enough to permit substantially uniform distribution of the particles throughout the finished friction article.

In summary, it should be observed that my invention, in the unsophisticated, nonoptimized volume concentrations illustrated in the above-demonstrative tests, the temperatures encountered during the process will cause them to fuse into a single glass constituent.

I claim:

1. A friction material for use as a brake lining consisting of:
   a metallic powder material selected from a group consisting of copper, iron, nickel and mixtures thereof for forming a matrix upon being sintered, said selected metallic material comprising from 25% to 80% by volume of the total friction material;
   a crystalline ceramic powder material selected from a group consisting of aluminum oxide, crystalline silicon oxide, mullite, kyanite, sillimanite, cordierite, forsterite and mixtures thereof for enhancing the frictional characteristics of the friction material, said selected ceramic material comprising from 0% to 30% by volume of the total friction material;
   graphite particles comprising from 0% to 32% by volume of the total friction material for controlling oxidation of the brake lining; and
   silicate glass powder particles having a viscosity above $10^{2.5}$ poises at temperatures between 1,000°C and 1,100°C and a particle size between −20 mesh and +325 mesh comprising from 1% to 50% by volume of the total friction material for controlling the formation of a surface glaze on the friction material created by thermal energy during engagement with a corresponding friction element to reduce the wear rate of the friction material.

2. The friction material, as recited in claim 1, wherein said silicate glass powder particles comprise 10% by volume and said graphite powder particles comprise 15% by volume of the total friction material.

3. The friction material, as recited in claim 1 wherein said silicate glass powder particles comprise between 2% to 15% by volume of the total friction material.

4. The friction material, as recited in claim 3 wherein said graphite powder particles comprise from 5% to 15% by volume of the total friction material.

5. The friction material, as recited in claim 4, wherein said selected crystalline ceramic powder material is mullite.

6. The friction material, as recited in claim 5, wherein said selected metallic powder is copper which comprise from 45% to 50% by volume of the total friction material.

7. A friction material having a surface resistant to wear with a substantially uniform coefficient of friction at a temperature above 1,000°C, said friction material consisting of:
  metallic elements selected from a group consisting of copper, iron, nickel and mixtures thereof for forming a matrix upon being sintered at a temperature above 925°C, said selected metallic elements comprising from 40% to 80% by volume of the total friction material;
  ceramic elements combined with said selected metallic elements and selected from a group consisting of aluminum oxide, crystalline silicon oxide, mullite, kyanite, sillimanite, cordierite, forsterite, and mixtures thereof for providing a modifier to enhance the frictional characteristics of the friction material, said selected ceramic elements comprising from 0 to 30% by volume of the total friction material;
  graphite elements combined with said metallic elements and comprising from 0 to 30% by volume of the total friction material for controlling oxidation of the friction material in temperatures above 1,000°C; and
  silicate glass particles having a viscosity above $10^{2.5}$ poises at temperatures between 1,000°C and 1,100°C and a particle size between −20 mesh and +325 mesh being combined with said metallic elements and comprising from 1% to 50% by volume of the total friction material for forming a glaze coating with a controlled thickness on said surface during frictional engagement with a corresponding element to reduce the wear rate of the friction material.

8. The friction material, as recited in claim 7, wherein said silicate glass powder particles comprise 10% by volume and said graphite powder particles comprise 15% by volume of the total friction material.

9. The friction material, as recited in claim 7, wherein said silicate glass powder particles comprise between 2% to 15% by volume of the total friction material.

10. The friction material, as recited in claim 7, wherein said graphite powder particles comprise from 5% to 15% by volume of the total friction material.

11. The friction material, as recited in claim 7, wherein said selected crystalline ceramic powder material is mullite.

12. The friction material, as recited in claim 7, wherein said selected metallic powder is copper which comprise from 45% to 50% by volume of the total friction material.

* * * * *